United States Patent
Diab

(10) Patent No.: US 8,601,299 B2
(45) Date of Patent: Dec. 3, 2013

(54) SYSTEM AND METHOD FOR RE-BALANCING POWER SUPPLY EFFICIENCY IN A NETWORKING ENVIRONMENT

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 268 days.

(21) Appl. No.: 13/169,106

(22) Filed: Jun. 27, 2011

(65) Prior Publication Data

US 2012/0331315 A1 Dec. 27, 2012

(51) Int. Cl.
*G06F 1/32* (2006.01)

(52) U.S. Cl.
USPC .............................. 713/320; 307/52; 713/310

(58) Field of Classification Search
USPC .................... 713/310, 320; 307/52
See application file for complete search history.

(56) References Cited

U.S. PATENT DOCUMENTS 7,831,843 B2 * 11/2010 Brundridge et al. .......... 713/300
8,084,884 B1 * 12/2011 Lakshmikanthan et al. .... 307/52

* cited by examiner

*Primary Examiner* — Albert Wang
(74) *Attorney, Agent, or Firm* — Duane S. Kobayashi

(57) ABSTRACT

A system and method for re-balancing power supply efficiency in a networking environment. Identification of changes in a network device that affect power consumption can be used to generate power request messages that are communicated to a power supply control via a communication bus. Based on such power request messages, the power supply control can then identify a re-balanced configuration of the power supply system to enable efficient operation of the power supply system.

15 Claims, 5 Drawing Sheets

US 8,601,299 B2

SYSTEM AND METHOD FOR RE-BALANCING POWER SUPPLY EFFICIENCY IN A NETWORKING ENVIRONMENT

BACKGROUND

1. Field of the Invention

The present invention relates generally to network systems and, more particularly, to a system and method for re-balancing power supply efficiency in a networking environment.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced.

One of the challenges in addressing these energy costs relates to the efficiency of power usage. To illustrate this challenge, consider a large power over Ethernet (PoE) switch that contains 384 ports. Such a 384-port PoE switch can be configured in a variety of ways in responding to the ever-changing needs of an enterprise. For example, the 384-port PoE switch can change configurations by adding or removing a single 48-port PoE line card. Whether adding or removing a 48-port PoE line card, the change in power required to support or not support those 48 PoE ports can be significant.

In combination, the 48 ports can have a range of power consumption. For example, a single PoE Plus port can require a minimum of 60 W of four-pair power, while a standard PoE port can require 15.4 W of power. Thus, depending on the mix of PoE Plus ports, standard PoE ports, and non-PoE ports, the total power required by the 48-port PoE line card can range significantly. This range is only increased when considering the combined variance of eight line cards that can be included in the 384-port PoE switch. As would be appreciated, while the total power required to support the 384-port PoE switch can easily extend to 2 kW, the potential for usage of far less than 2 kW is also significant.

The power supply that supports network equipment has a power supply efficiency curve. An example of a power supply efficiency curve is illustrated in FIG. 1. Here, the power supply efficiency can be calculated by dividing the output power by the input power. As illustrated, the power supply efficiency is typically lower when the output power of the power supply is a small faction of the rated capacity of the power supply, and increases as the output power of the power supply approaches the rated capacity of the power supply.

In general, power supply manufacturers design a power supply to be efficient at a certain load point or narrow range of operation. Operation of a power supply at a non-optimal load point or range of operation will lead to operation of the power supply at a poor power efficiency.

For example, consider a power supply that can operate at 90% efficiency at a desired load point or range of operation. At 90% efficiency, the power supply would require, for example, 550 W of input power to produce 495 W of output power. In contrast, when operating at a non-optimal load point that has 70% efficiency, the power supply would require 707 W of input power to produce the same 495 W of output power. As this simple example illustrates, the efficiency of the power supply at a particular operational load point has a direct relation to the amount of input power needed to power the system.

For an enterprise, the operation of power supplies across the entire network infrastructure at a poor efficiency can lead to significant economic waste as more power than otherwise needed is required to power the network infrastructure. What is needed therefore is a mechanism for re-balancing power supply efficiency in a network environment.

SUMMARY

A system and/or method for re-balancing power supply efficiency in a networking environment, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Power supplies are generally designed to be efficient at a certain load point or narrow range of operation. In operation, however, a power supply can be called upon to support a wide range of power needs that reflect varied usage of a device. This typical usage results in power supply inefficiency, which when multiplied by a host of devices, leads to a significant waste of resources.

In the present invention, it is recognized that power supply inefficiency is due in part to the limited awareness by the power supply of the actual needs of the system it supports. It is therefore a feature of the present invention that power supply efficiency is improved through a control mechanism that enables a power supply to identify a re-balanced configuration that enables higher energy efficiency at a particular load point or range of operation.

Figure 1:
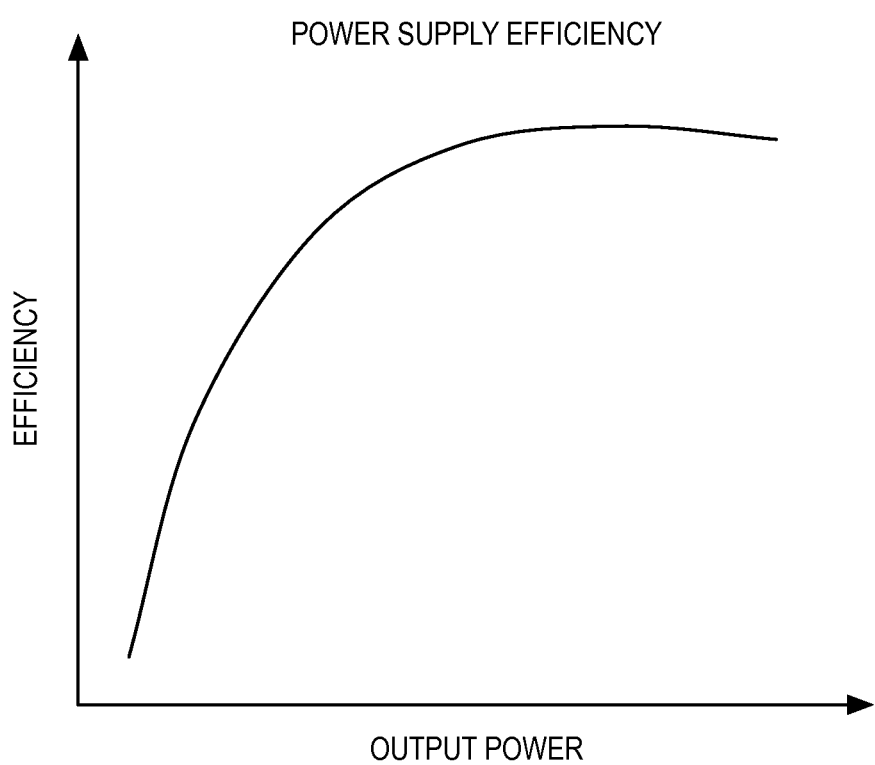
FIG. 1 illustrates an example of a power supply efficiency curve.
Figure 2:
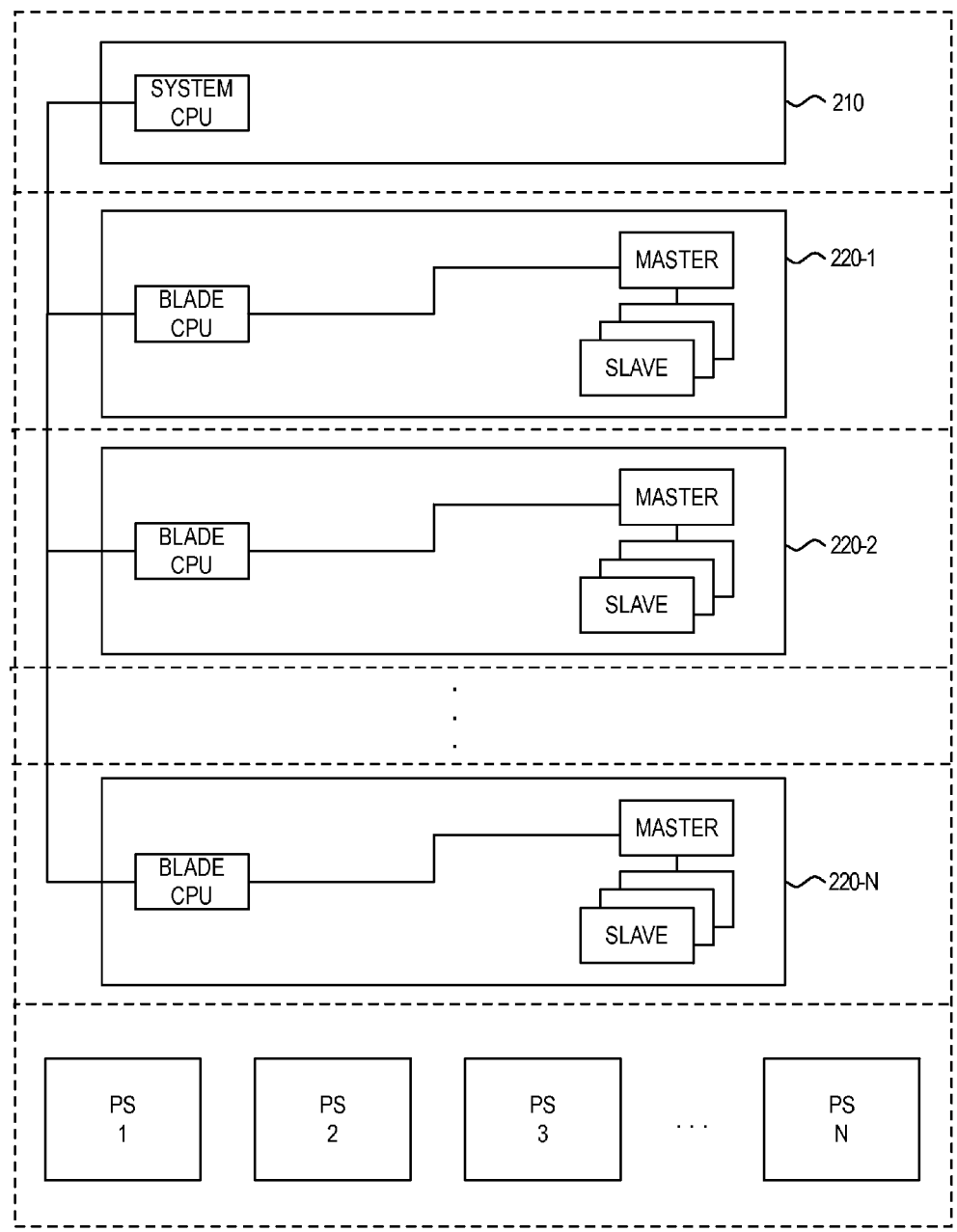
FIG. 2 illustrates an example of a power over Ethernet switch.

Prior to describing the details of the present invention, reference is made to FIG. 2, which illustrates an example network device such as a power over Ethernet (PoE) switch. As illustrated, the PoE switch includes management blade 210 that contains a system CPU, and PoE blades 220-1 to 220-N that each contain a local CPU and master/slave power source equipment (PSE) controllers. In one example, blade 220-1 can have a master quad controller PSE and 11 slave quad controller PSEs that combine to support a total of 384 ports.

As further illustrated in FIG. 2, the PoE switch also includes a plurality of power supplies PS1-PSN. The plurality of power supplies PS1-PSN can collectively power the various PoE line cards. In one power supply protection scheme, an N+1 redundant system is used wherein a single redundant power supply can be substituted for a failed power supply.

Detection of a failure of a particular power supply PS1-PSN can be performed through the receipt of a power supply status signal. This power supply status signal is typically generated by a single pin, whose output signal value represents a power good/power fail status of the power supply.

When operational, a power supply system is designed to provide as much power as is needed, up to and including the highest level of power supply system capacity. The actual power needed can vary, however. For example, the actual power needed by each PoE line card is, of course, dependent on the mix of powered devices (PDs) that each PoE line card supports. The mix of PDs supported by the plurality of PoE line cards would typically not be known a priori. Accordingly, the efficiency of the power supply system would be dependent on the particular mix of PDs supported across all of the PoE line cards. If the mix of PDs use up the total power budget of the power supply system, then high energy efficiency would be achieved. On the other hand, if the mix of PDs use up a small fraction of the total power budget, then high energy efficiency would not be achieved.

In the present invention, it is recognized that power supply efficiency can be increased with knowledge of actual and future power needs. Such knowledge would enable a power supply controller module to identify a re-balanced configuration of a power supply system to provide the needed amount of power more efficiently.

In general, a power supply is designed with a certain capacity. This capacity is defined by a specific topology that is enabled using transformers and conversion circuits, which are organized to produce a certain power level. When the power supply operates outside of that particular power level, inefficient operation of the power supply results. In a broader context, various issues arise in leveraging a plurality of power supplies across a network.

One issue that can arise is the variance in power supply behavior between different manufacturers. For example, while an original equipment manufacturer (OEM) can expect consistent behavior at a particular load point between different manufacturers, the behavior across the power supplies between the different manufacturers can vary significantly as the operational load point moves away from the ideal load point.

A power supply can add or reduce capacity through phase switching in or out, rails in the power supply. Phase switching in or out more rails of the power supply can involve the activation or deactivation of parallel transformers and conversion circuitry to deal with the change in load. As will become apparent, the principles of the present invention are not dependent on a particular re-balancing mechanism in adapting to a change in load of a power supply.

In adding or removing capacity within a power supply, it is recognized that the reaction time between power supplies can also vary. This can be due to various factors such as the manufacturer's design, the particular load point, or the like. For example, it may take a power supply 2 µs to transition from 2 kW to 2.5 kW, but take 30 µs to transition the power supply from 2 kW to 3 kW. Again, these transition times will largely depend on the architecture defined by the power supply manufacturer.

In the present invention, it is recognized that variance between power supplies will continue to exist as power supply manufacturers address the various design and cost tradeoffs in their own way. Increasing the efficiency of power supply operation is still needed, however, notwithstanding these variances.

It is therefore a feature of the present invention that power supply efficiency can be increased by communication of power needs parameters to a power supply. The communication of these power needs parameters enables the power supply to identify a re-balanced configuration that is directed to a particular power level of operation.

Figure 3:
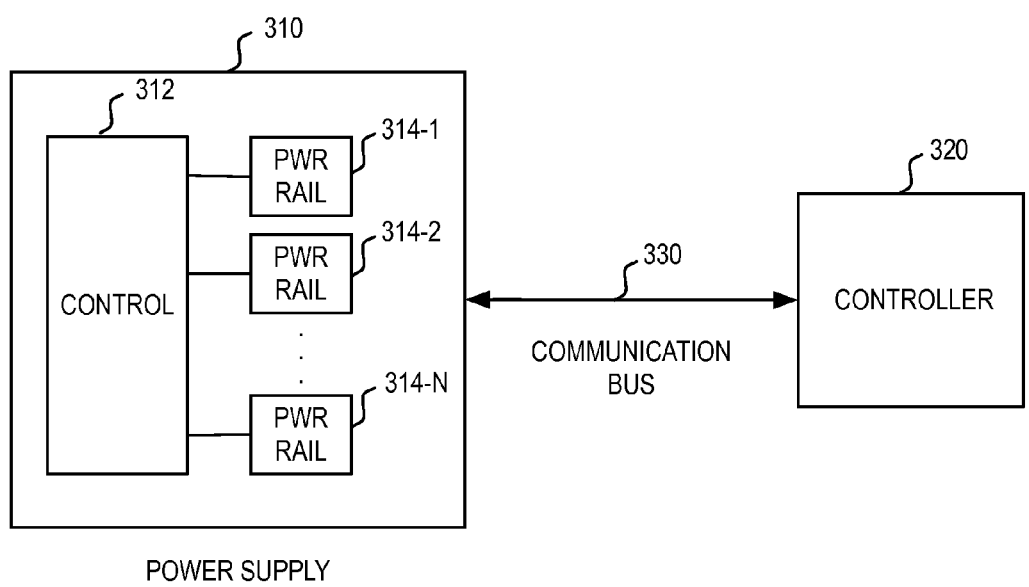
FIG. 3 illustrates an embodiment of a power supply control module that communicates with a controller via a communication bus.

FIG. 3 illustrates a framework that enables an increase in power supply efficiency. As illustrated, power supply 310 includes a plurality of power rails 314-1 to 314-N that can be used to add or remove power supply capacity. Control of the activation/deactivation of power rails 314-1 to 314-N is effected by control module 312. As further illustrated in FIG. 3, power supply 310 is coupled to controller 320 via communication bus 330.

In general, controller 320 can represent any module that governs or has knowledge of current and/or future power needs in a device or subsystem. As such, controller 320 can represent a single module or a plurality of modules that are coupled to power supply 310 via a communication bus. As will become apparent, the communication between power supply 310 and one or more controllers 320 enables a negotiation to be performed in addressing the power needs of the system served by power supply 310.

Power supply control module 312 is generally designed to receive power needs parameters from controller 320 via communication bus 330. These power needs parameters enable power supply control module 312 to identify the particular power level needed at a particular point in time (i.e., current or in the future). In one example, a message received from controller 320 via communication bus 330 would identify an amount of power needed. In the example of a PoE switch, this amount of power can represent an amount of power determined based on inputs from one or more PSE controllers.

In general, communication bus 330 is designed to facilitate power request/response messaging between controller 320 and power supply 310. In this framework, a response to a request for a particular level of power can include not only an identification of a level of power that will be made available, but also a time at which the power will be made available. The indication of a time at which the power will be made available represents a latency parameter that can affect policy decisions.

As indicated by the example above, there is a substantial difference in reaction time in moving from 2 kW to 2.5 kW as compared to moving from 2 kW to 3 kW. With knowledge that the power supply is to move from 2 to 2.5 kW, power supply control module 312 can then identify a time at which the 2.5 kW level of power will be made available. Knowledge of the particular time that the 2.5 kW level of power will be made available will then enable controller 320 to respond accordingly. For example, controller 320 can choose to power up connected PoE ports that are active on the new PoE line card in parallel as controller 320 knows that the power supply will react quickly. Conversely, if controller 320 knows that the reaction time is much slower, then controller 320 can choose to serially power up ports on the PoE line card. Here, it is significant that controller 320 can be responsive to the decisions made by power supply control module 320 in identifying and implementing a re-balanced configuration that produced high power supply efficiency.

Figure 4:
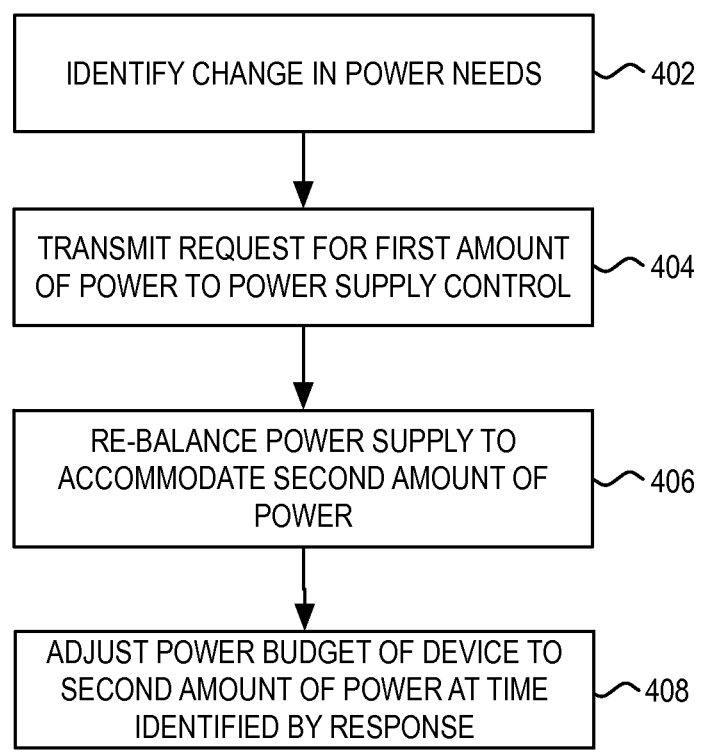
FIG. 4 illustrates a flowchart of a process of the present invention.

FIG. 4 illustrates an example process by which a power supply control module can increase power supply efficiency through identification of a re-balanced configuration of the power supply. To illustrate the process, consider again the example where a power supply control module is responding to power request messaging from a PSE controller. In one example, the power request messaging could be a result of an installation of a new PoE line card. Here, the PSE controller in the PoE line card can identify, at step 402, a power budget that is sought to be distributed to a plurality of PDs coupled to the PoE line card. For example, the power budget can be established manually by an IT administrator, or can represent an accumulation of power requests by a plurality of PDs. More generally, the identification of a change in power needs can result from a power change in a single port based on an addition of a PD, removal of a PD, or change in power needs for a PD.

Upon identification of a change in power needs, the PSE controller would then transmit, via a communication bus, a power request message to the power supply control module at step 404. This power request message can include information that enables the power supply control module to identify a power budget needed by the PoE line card. After receipt of such a power request message, the power supply control module could then identify a re-balanced configuration that would enable an additional amount of power to be generated efficiently. In one example, the power supply control module could determine that an additional power rail should be phase switched in. Here, the activation of the additional power rail by the power supply control module would represent an efficient use of the additional power supply as compared to activation under a lower total power demand of the PoE switch.

The above scenario represents a simple example of identifying a re-balanced configuration of a power supply system for continued operation at high energy efficiency. In general, the principles of the present invention are premised on a recognition that a power supply system can have a plurality of power efficiency curves that represent different configured modes of operation. In various examples, the plurality of power efficiency curves can represent different numbers of power rails and/or different numbers of distinct power supplies that have been activated. As would be appreciated, the principles of the present invention are not dependent on the particular mechanisms for generating a plurality of power efficiency curves in a power supply system.

Here again, it should also be noted that the power supply control module can be responsive to one or more controllers that have access to power needs parameters. In one scenario, power supply control module can be responsive to a single controller that is designed to communicate power request messaging on behalf of a device or subsystem.

As noted, the power request message generated by a controller can identify a power need at a particular point in time. In one example, the power request message can identify a power need at a point in time in the future. An example of such a scenario would be an additional power need that is requested by one or more PDs that are newly connected to a PoE line card. In this example, the power supply control can analyze the power request message to determine how best to accommodate the power need from an efficiency perspective. In identifying a re-balanced configuration of the power supply system, the power supply control module can then return a response to the power request message that identifies a power level that can be accommodated (e.g., equal to or lower than the power need requested) and a point in time at which additional power would be made available by the power supply system upon re-balancing of the power supply system configuration.

As noted, this response message can identify a second amount of power that is different from that requested. At step 406, the power supply control module would then re-balance the configuration of the power supply system to supply the second amount of power identified in the response message. The re-balanced configuration would enable the power supply system to generate the new amount of power efficiently.

Upon receipt of the response to the power request message over the communication bus, the controller can then schedule, at step 408, a provision of power (e.g., to supported PDs) at the point in time identified by the response message. As would be appreciated, where the response to the power request message identifies a lower amount of power than that requested by the controller, the controller can then adjust the power consumption accordingly. For example, a PSE controller can adjust a distribution of power to connected PDs to accommodated a power budget that is lower than that requested.

The above example illustrates a scenario where an increase in power is identified by a power request message that is delivered to a power supply control via a communication bus. As would be appreciated, the identification of a re-balanced configuration for efficient operation of a power supply system can be response to any dynamic change (e.g., increase or decrease) that occurs in power consumption. In responding to the dynamic changes in power consumption, the ability of the power supply control module to respond to such requests is limited by the speed at which the particular power supply system can re-balance its configuration. The granularity of such re-balancing would be implementation dependent.

In general, the principles of the present invention are designed to increase power supply efficiency for any powering scenario that features dynamic changes in power consumption. For example, the principles of the present invention can be applied to energy efficient (EE) networks that seek to save power when the traffic utilization of the network is not at its maximum capacity. This serves to minimize the performance impact while maximizing energy savings. At a broad level, the EE control policy for a particular device determines when to enter an energy saving state, what energy saving state (i.e., level of energy savings) to enter, how long to remain in that energy saving state, what energy saving state to transition to out of the previous energy saving state, etc. Here, EE control policies can base these energy-saving decisions on a combination of settings established by an IT manager and the properties of the traffic on the link itself.

Figure 5:
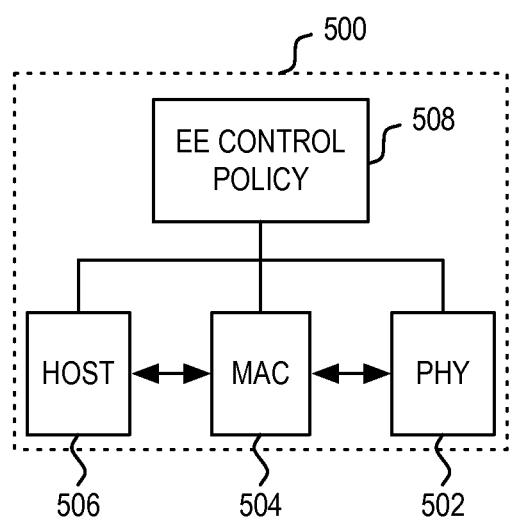
FIG. 5 illustrates an example of an energy efficient control policy in a network device.

FIG. 5 illustrates an EE control policy in a network device, which can represent a switch, router, endpoint (e.g., server, client, VOIP phone, wireless access point, etc.), or the like. As illustrated, network device 500 includes physical layer device (PHY) 502, media access control (MAC) 504, and host 506. In general, host 506 may comprise suitable logic, circuitry, and/or code that may enable operability and/or functionality of the five highest functional layers for data packets that are to be transmitted over the link. Since each layer in the OSI model provides a service to the immediately higher interfacing layer, MAC controller 504 may provide the necessary services to host 506 to ensure that packets are suitably formatted and communicated to PHY 502. MAC controller 504 may comprise suitable logic, circuitry, and/or code that may enable handling of data link layer (Layer 2) operability and/or functionality. MAC controller 504 can be configured to implement Ethernet protocols, such as those based on the IEEE 802.3 standard, for example. PHY 502 can be configured to handle physical layer requirements, which include, but are not limited to, packetization, data transfer and serialization/deserialization (SERDES).

As FIG. 5 further illustrates, network device 500 also includes EE control policy entity 508. In general, EE control policy entity 508 can be designed to determine when to enter an energy saving state, what energy saving state (i.e., level of energy savings) to enter, how long to remain in that energy saving state, what energy saving state to transition to out of the previous energy saving state, etc. In general, EE control policy entity 508 can comprise suitable logic, circuitry, and/or code that may be enabled to establish and/or implement an energy efficiency control policy for network device 500. In various embodiments, EE control policy entity 508 can be a logical and/or functional block which may, for example, be implemented in one or more layers, including portions of the PHY or enhanced PHY, MAC, switch, controller, or other subsystems in the host, thereby enabling energy-efficiency control at one or more layers.

In the present invention, EE control policy entity 508 can be designed to send power request messages to the power supply control via a communication bus that are reflective of changes in power consumption state. For example, EE control policy entity 508 can send a power request message when an energy saving state is entered, or when an energy saving state is exited. As would be appreciated, any changes in operation of a network device that affects power consumption can be used to trigger a re-balancing of a power supply configuration.

In one embodiment, the principles of the present invention can be used to assist in the implementation of power backup. In many systems, there is an additional supply or supplies for power backup in case the primary power supply or supplies fail. The additional supply or supplies can be in a redundant formation or in an N+1 formation.

In the present invention, as the system demands change over time, one or more controllers can query the power supply or use data from the power supply generated at different points to identify what the reaction time of the power supply is. This information will enable the controllers to make policy decisions. For example, in a high-availability system designed for continued online use, crossing over a power level threshold (e.g., 2.5 kW noted in the example above) that leads to lower reaction time in bringing more power online can be undesirable. Should that occur, the controllers can then make policy decisions to either limit the current load, or begin to classify loads as primary or secondary, such that secondary power users are shed initially on system failover to a new supply to keep the power supply in a quick-response mode.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method for power efficiency in a network switch, said network switch having a power supply system that supplies power for said network switch, comprising:
    generating, in response to an installation of a power over Ethernet line card in said network switch, a power request that identifies a first amount of power needed to support a powering of a plurality of Ethernet ports in said power over Ethernet line card;
    transmitting, via a communication bus, said power request to said power supply system;
    receiving, from said power supply system via said communication bus, a response to said power request that identifies a second amount of power;
    increasing a total power output of said power supply system to said network switch by said second amount of power;
    establishing said second amount of power as a total power budget for said power over Ethernet line card; and
    determining an amount of power to be provided to each of said plurality of Ethernet ports in said power over Ethernet line card based on said total power budget.

2. The method of claim 1, wherein said receiving comprises receiving a response that identifies a second amount of power lower than said first amount of power.

3. The method of claim 1, wherein said receiving comprises receiving a response that also identifies a point in time at which said increasing is to occur.

4. The method of claim 1, wherein said increasing comprises re-balancing a multiple phase power supply at a higher efficiency.

5. The method of claim 1, wherein said determining comprises identifying which of said plurality of Ethernet ports can receive power.

6. A method comprising:
    generating, by power supply system that includes a multiple phase power supply, a first amount of power for said network device;
    transitioning, in response to an indication of a low traffic utilization condition by said network device, one or more components in said network device from an active state to a reduced power state;
    generating a power reduction request, said power reduction request including information that enables an identification of a reduced amount of power needed to support a powering of said network device when said one or more components are in said reduced power state;
    transmitting, via a communication bus, said power reduction request to said power supply system;
    identifying, by said power supply system in response to said power reduction request, a re-balanced configuration of said power supply system to support said reduced amount of power;
    re-balancing said multiple phase power supply at a higher efficiency; and
    generating, by said power supply system, a second amount of power for said network device using said re-balanced configuration.

7. The method of claim 6, wherein said indication is a scheduled time of day for reduced power operation of said network device.

8. The method of claim 6, wherein said indication is an entry by a physical layer device in said network device into a low power state.

9. The method of claim 6, wherein said indication is a reduction in transmission rate of said network device.

10. The method of claim 6, wherein said indication is an entry by a subsystem of said network device into a low power state.

11. A power efficient network device, comprising:
- a controller that identifies a change in a power requirement of said network device from a first power level to a second power level due to a change in powering of one or more power over Ethernet components in said network device; and
- a power supply system coupled to said controller via a communication bus, said power supply system receiving a power request from said controller via said communication bus in response to said identified change in said power requirement of said network device, said power supply system identifying a re-balanced configuration for said power supply system in response to said power request, said re-balanced configuration enabling an increase in an efficiency of a delivery of power by said power supply system to said network device at said second power level.

12. The device of claim 11, wherein said power request includes information that enables an identification of an increase in power.

13. The device of claim 11, wherein said power request includes information that enables an identification of a decrease in power.

14. The device of claim 11, wherein said re-balanced configuration includes switching on one or more power rails of said power supply system.

15. The device of claim 11, wherein said re-balanced configuration includes switching off one or more power rails of said power supply system.

* * * * *